US010850470B2

(12) United States Patent
Sager

(10) Patent No.: US 10,850,470 B2
(45) Date of Patent: Dec. 1, 2020

(54) SIZE-ADJUSTABLE MANDREL AND METHOD OF CONSTRUCTING A BOX USING THE SAME

(71) Applicant: DOME ZERO INC., Lexington, MA (US)

(72) Inventor: Yildiray Sager, Lexington, MA (US)

(73) Assignee: DOME ZERO INC., Lexington, MA (US)

( * ) Notice: Subject to any disclaimer, the term of this patent is extended or adjusted under 35 U.S.C. 154(b) by 161 days.

(21) Appl. No.: 16/113,586

(22) Filed: Aug. 27, 2018

(65) Prior Publication Data

US 2019/0061298 A1    Feb. 28, 2019

Related U.S. Application Data

(60) Provisional application No. 62/550,122, filed on Aug. 25, 2017, provisional application No. 62/550,301, filed on Aug. 25, 2017.

(51) Int. Cl.
*B31B 50/28* (2017.01)
*B31B 50/62* (2017.01)
(Continued)

(52) U.S. Cl.
CPC .............. *B31B 50/28* (2017.08); *B31B 50/20* (2017.08); *B31B 50/622* (2017.08); *B31C 1/083* (2013.01);
(Continued)

(58) Field of Classification Search
CPC .......... B65D 5/08; B65D 3/20; B65D 5/0005; B31B 50/28; B31B 50/20; B31B 50/622;
(Continued)

(56) References Cited

U.S. PATENT DOCUMENTS

| 726,894 A | 5/1903 | Ferres |
| 1,502,864 A | 7/1924 | Milligan |

(Continued)

FOREIGN PATENT DOCUMENTS

| CN | 201120970 Y | 9/2008 |
| GB | 1331630 | 9/1973 |

(Continued)

OTHER PUBLICATIONS

Non Final Office Action for U.S. Appl. No. 16/113,114, dated Jun. 11, 2019, 7 pages.

(Continued)

*Primary Examiner* — Anna K Kinsaul
*Assistant Examiner* — Chinyere J Rushing-Tucker
(74) *Attorney, Agent, or Firm* — Daly, Crowley & Mofford & Durkee, LLP

(57) ABSTRACT

A mandrel designed for use in the construction of a custom-sized box includes a common platform on which a plurality of peripheral members is independently mounted. Each peripheral member comprises a disc-shaped base rotatably mounted on the common platform, a tongue slidably mounted within a channel formed in the base, and a vertical upright rotatably mounted at one end of the tongue. To construct a box, an elongated continuous strip of material is helically wrapped around the vertical uprights to form a main box body with a plurality of bands. Cutting mechanisms in each upright are actuated to create slots in the main box body that define flaps used to selectively enclose the open top and bottom ends of the box body. By reconfiguring the vertical uprights in the mandrel, a customized box can be constructed that is dimensioned to receive a consumer product with limited wasted space.

10 Claims, 11 Drawing Sheets

(51) Int. Cl.
| | |
|---|---|
| *B31B 50/20* | (2017.01) |
| *B65D 3/20* | (2006.01) |
| *B31C 1/08* | (2006.01) |
| *B31C 11/04* | (2006.01) |
| *B32B 29/00* | (2006.01) |
| *B32B 29/08* | (2006.01) |
| *B65D 5/355* | (2006.01) |
| *B65D 5/08* | (2006.01) |
| *B31B 110/35* | (2017.01) |
| *B31B 120/70* | (2017.01) |

(52) U.S. Cl.
CPC ............ *B31C 11/04* (2013.01); *B32B 29/005* (2013.01); *B32B 29/08* (2013.01); *B65D 3/20* (2013.01); *B65D 5/0005* (2013.01); *B65D 5/08* (2013.01); *B31B 2110/35* (2017.08); *B31B 2120/70* (2017.08); *B32B 2439/62* (2013.01)

(58) Field of Classification Search
CPC ....... B32B 29/005; B32B 29/08; B31C 1/083; B31C 11/04
USPC .......................................................... 493/56
See application file for complete search history.

(56) References Cited

U.S. PATENT DOCUMENTS

| | | | |
|---|---|---|---|
| 1,975,428 A | | 10/1934 | John |
| 2,016,273 A | | 10/1935 | Atwood |
| 2,179,504 A | | 11/1939 | Hasbrook |
| 2,262,242 A | | 11/1941 | Lenox |
| 2,315,217 A | | 3/1943 | Obiglio |
| 2,697,387 A | | 12/1954 | Falconer |
| 3,137,437 A | | 6/1964 | Svensson |
| 3,322,156 A | | 5/1967 | Stuart |
| 3,380,147 A | * | 4/1968 | McDonald ............. B21C 37/12 228/145 |
| 3,523,635 A | | 8/1970 | Croley et al. |
| 3,861,984 A | | 1/1975 | Poulsen |
| 4,349,110 A | | 9/1982 | Hayashi |
| 4,872,590 A | | 10/1989 | Sasaki et al. |
| 5,184,996 A | * | 2/1993 | Rode ...................... B31B 50/00 493/102 |
| 5,286,246 A | * | 2/1994 | Weder ..................... A01G 9/02 425/387.1 |
| 5,393,582 A | | 2/1995 | Wang et al. |
| 5,484,100 A | | 1/1996 | Rigby |
| 5,495,810 A | | 3/1996 | Yoshii |
| 5,566,530 A | * | 10/1996 | Johnstone ............. B65B 11/045 53/441 |
| 6,250,908 B1 | | 6/2001 | Foos |
| 6,939,424 B1 | * | 9/2005 | Takala ................ B29C 53/8091 156/191 |
| 10,308,392 B2 | | 6/2019 | Ogawa et al. |
| 2005/0236463 A1 | | 10/2005 | Boldrini et al. |
| 2007/0235100 A1 | | 10/2007 | Tomerlin et al. |
| 2008/0236765 A1 | | 10/2008 | Sager |
| 2009/0320999 A1 | | 12/2009 | Sekar et al. |
| 2010/0121312 A1 | | 5/2010 | Gielenz et al. |
| 2011/0067775 A1 | | 3/2011 | Simonsohn |
| 2015/0115022 A1 | | 4/2015 | Iwegbu |
| 2015/0336325 A1 | * | 11/2015 | Glasberg ............... B29C 53/821 156/184 |
| 2016/0039551 A1 | * | 2/2016 | Aganovic ............. B65B 43/265 493/123 |
| 2016/0060014 A1 | | 3/2016 | Timmers et al. |
| 2017/0112028 A1 | * | 4/2017 | Millman ................ B31B 50/46 |

FOREIGN PATENT DOCUMENTS

| | | |
|---|---|---|
| GB | 1 347 244 | 2/1974 |
| JP | S55 104621 U | 7/1980 |

OTHER PUBLICATIONS

Response to Office Action for U.S. Appl. No. 16/113,114, dated Sep. 10, 2019, 10 pages.
Final Office Action for U.S. Appl. No. 16/113,114, dated Oct. 1, 2019, 8 pages.
Response to Final Office Action for U.S. Appl. No. 16/113,114, dated Dec. 1, 2019, 13 pages.
Supplemental Response to Final Office Action for U.S. Appl. No. 16/113,114, dated Dec. 5, 2019, 13 pages.
RCE and Second Supplemental Response to Advisory Action for U.S. Appl. No. 16/113,114, dated Jan. 2, 2020, 12 pages.
Notification of Transmittal to the International Search Report and Written Opinion of the ISA, International Search Report and Written Opinion dated Dec. 21, 2018 for International Application No. PCT/US2018/048153, 10 pages.
Notification of Transmittal to the International Search Report and Written Opinion of the ISA, International Search Report and Written Opinion dated Oct. 18, 2018 for International Application No. PCT/US2018/048082, 10 pages.
Notification Concerning Transmittal of the International Preliminary Report on Patentability (Chapter I of the Patent Cooperation Treaty) dated Mar. 5, 2020 for International Application No. PCT/US2018/048153, 7 pages.
European Search Report, dated Jul. 1, 2020 for International Application No. 18848687.2, 8 pages.
Non Final Office Action dated Sep. 1, 2020, U.S. Appl. No. 16/790,997, 12 pages.

* cited by examiner

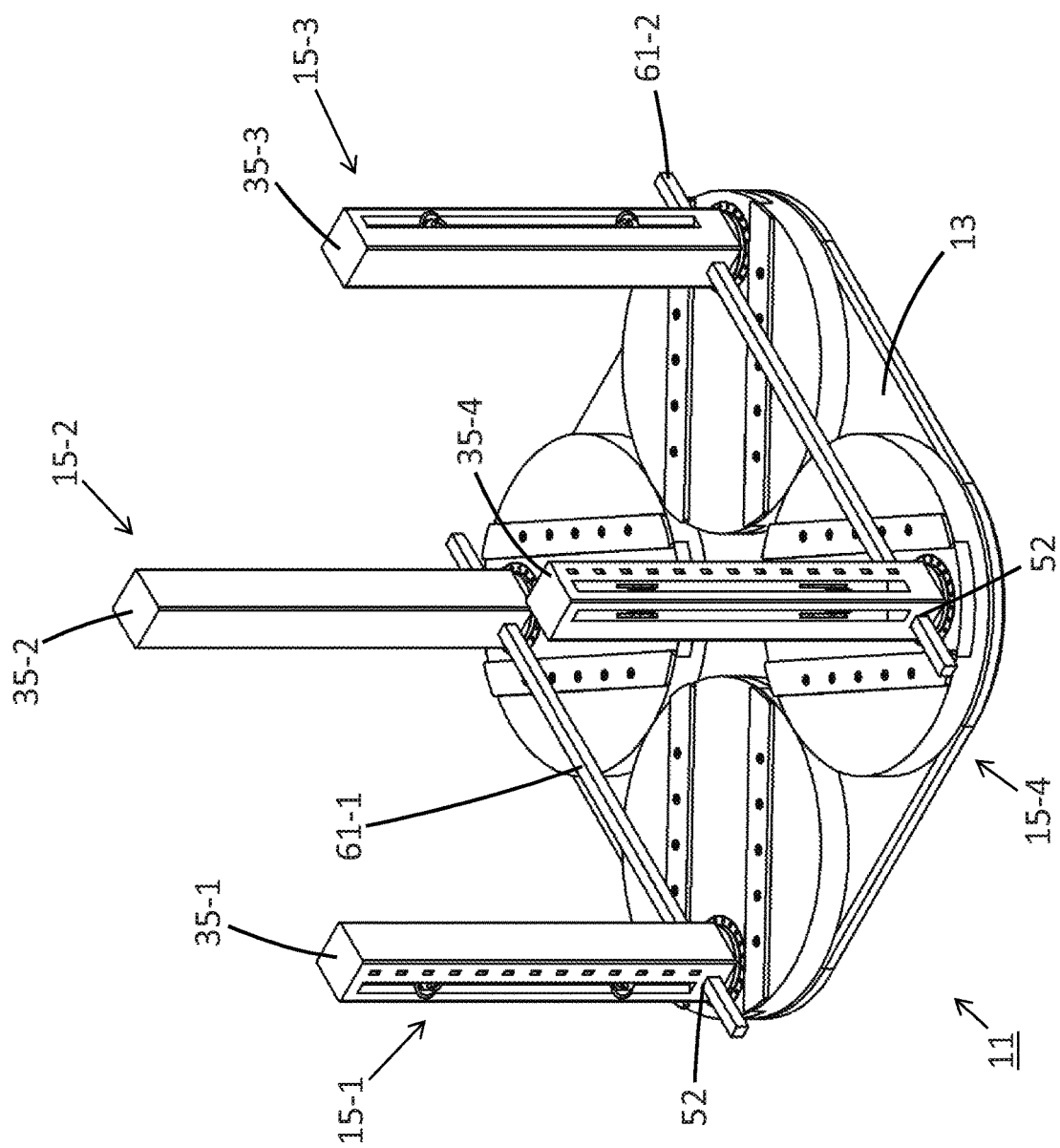

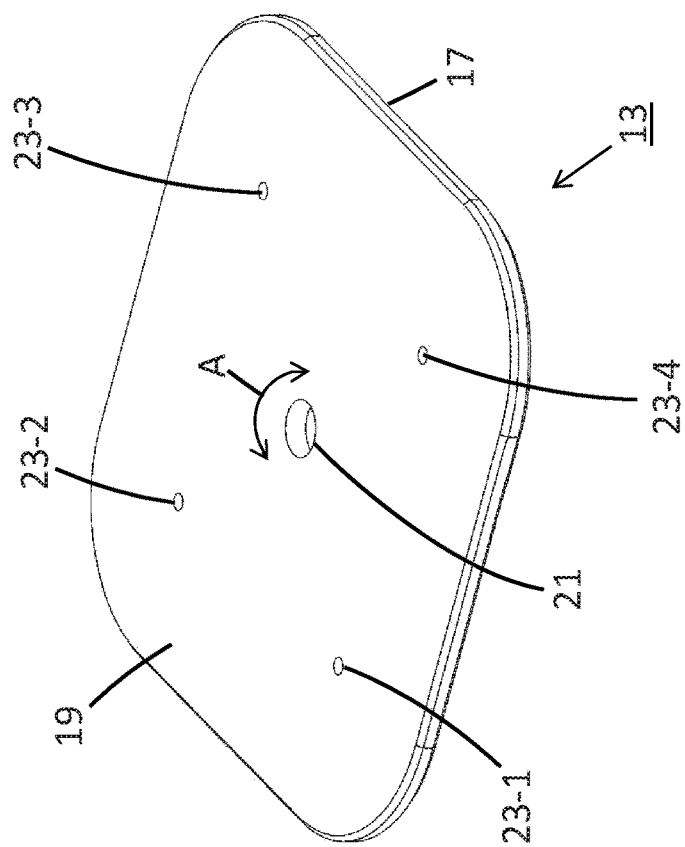
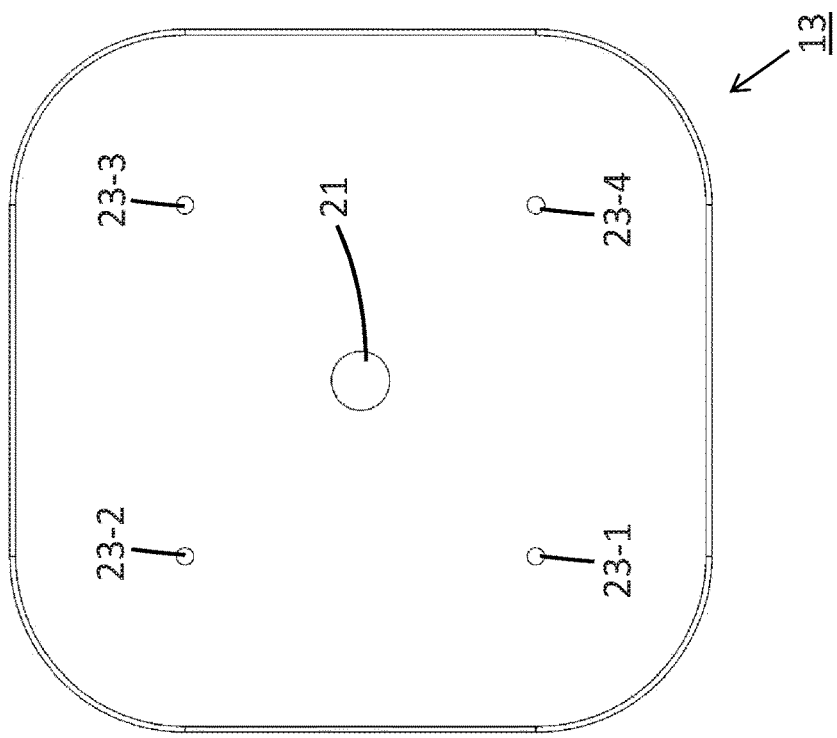

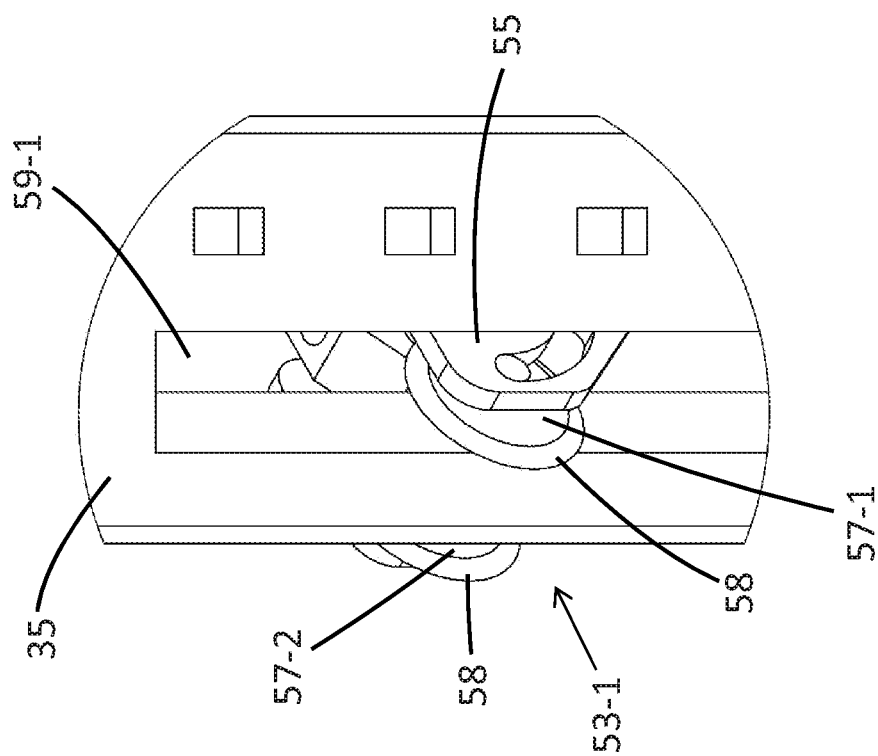
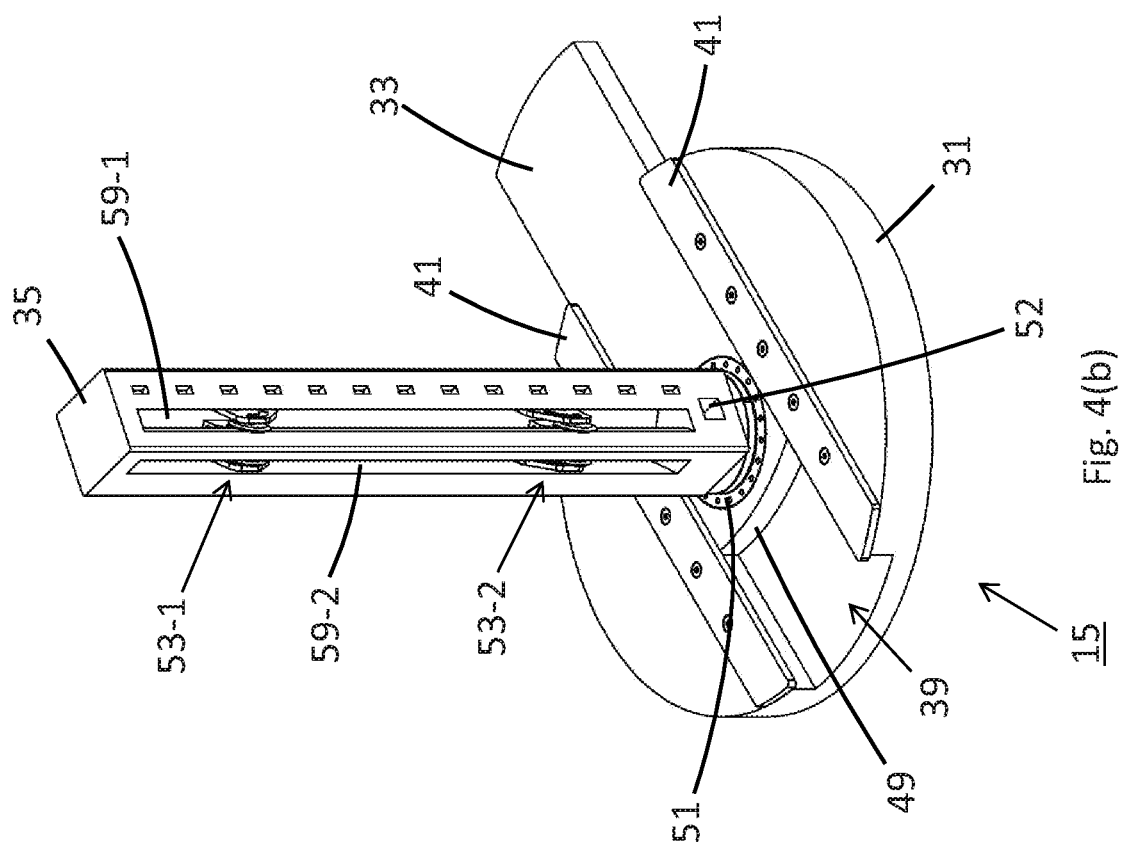

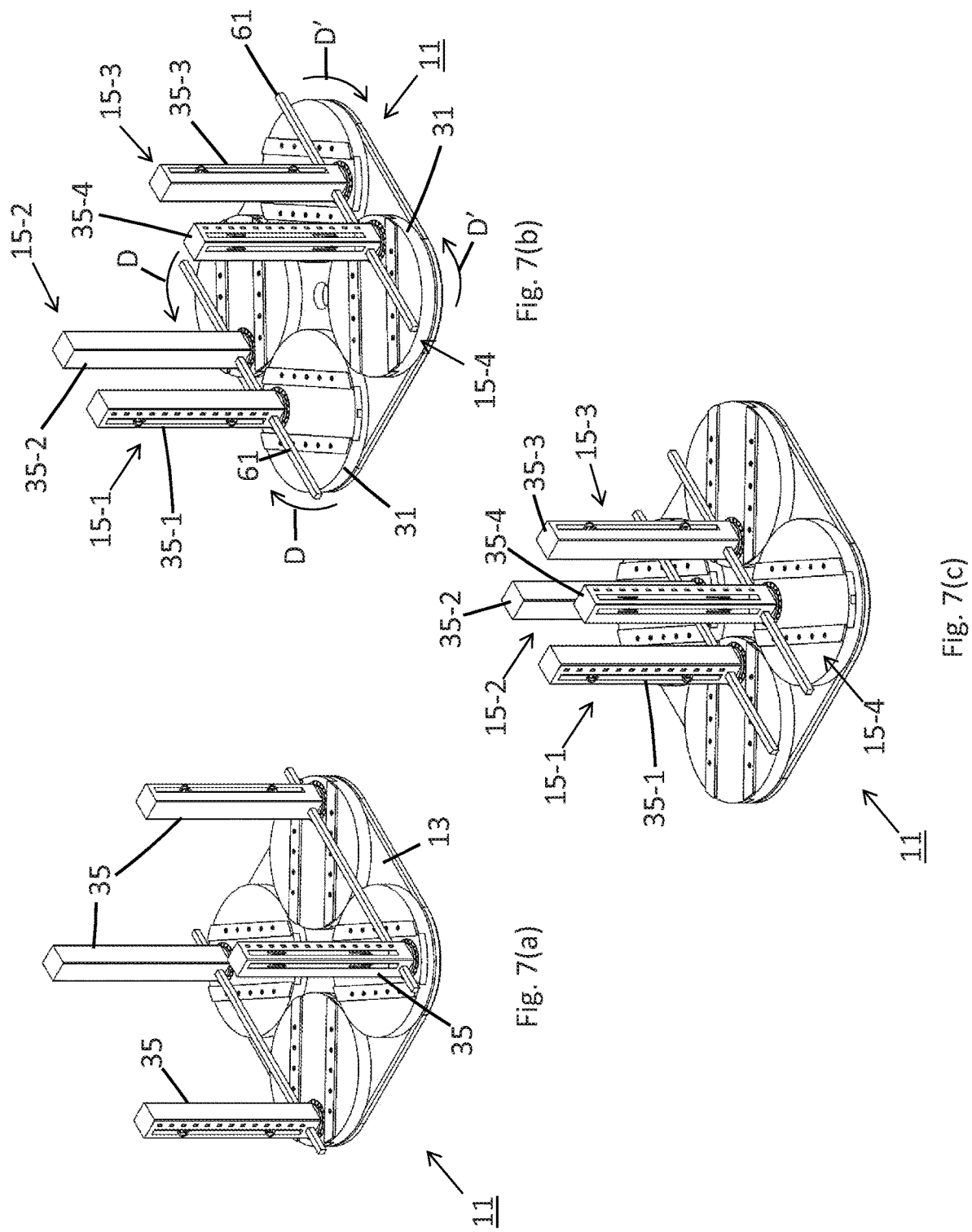

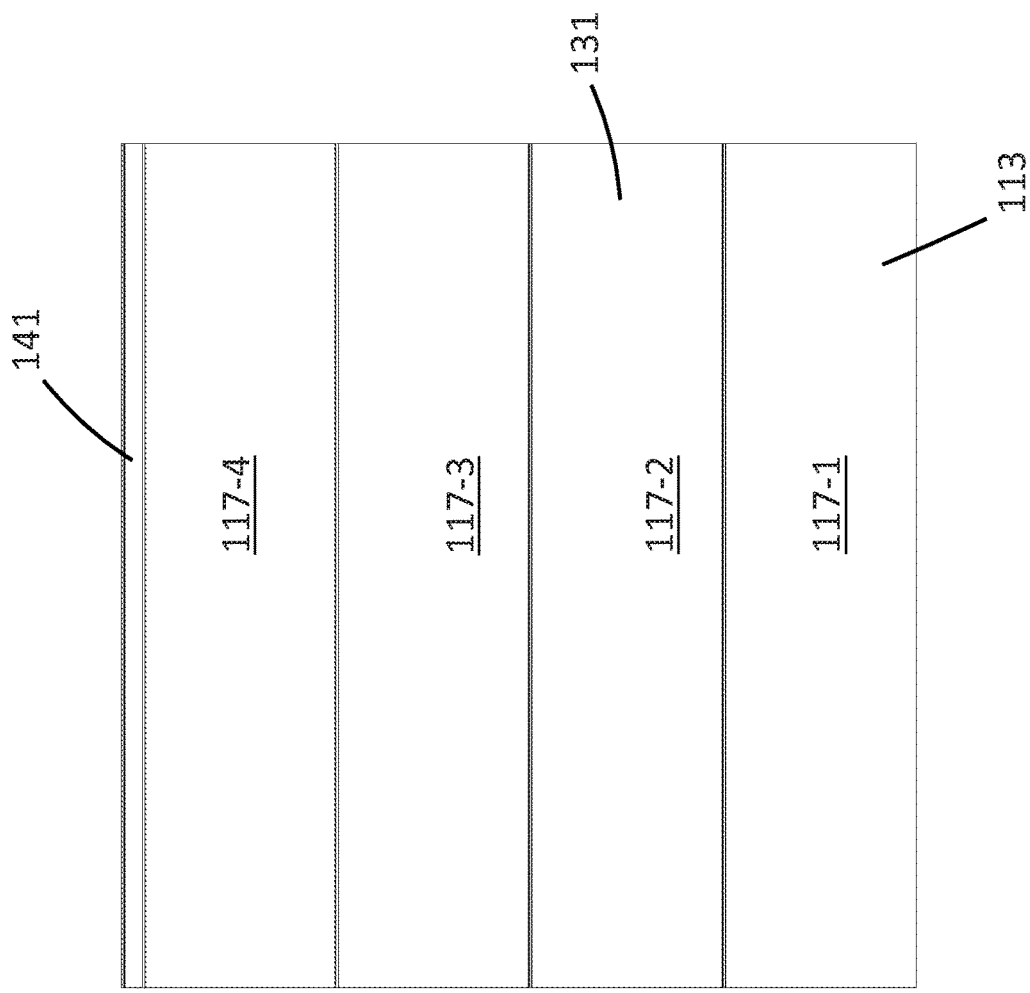
Fig. 9(a)
Fig. 9(b)
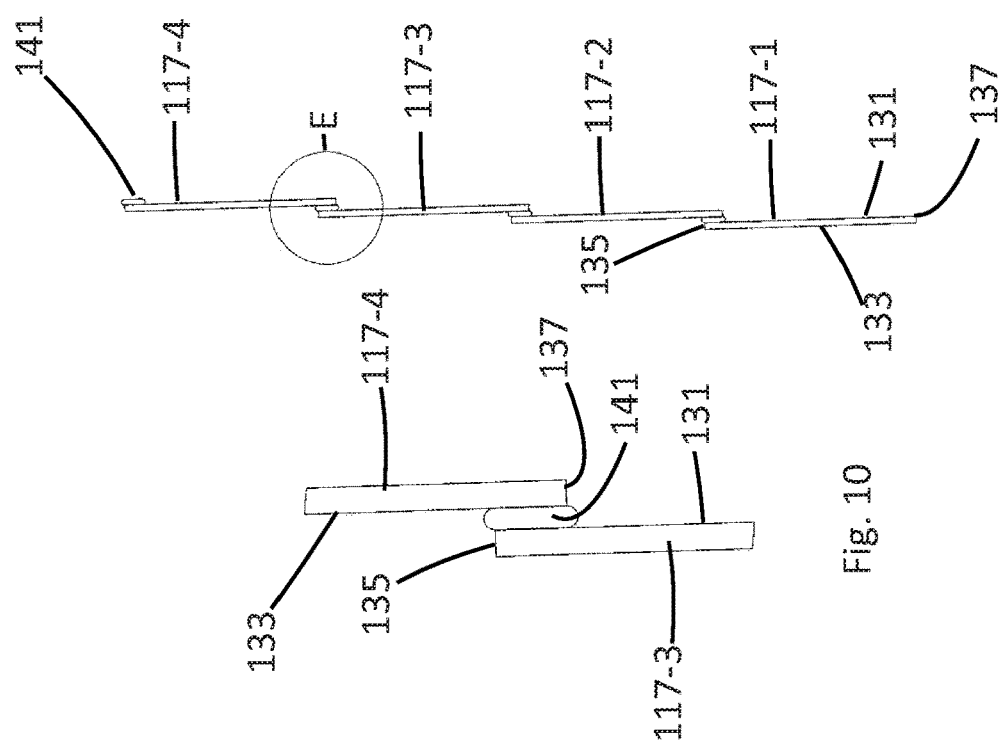
Fig. 10

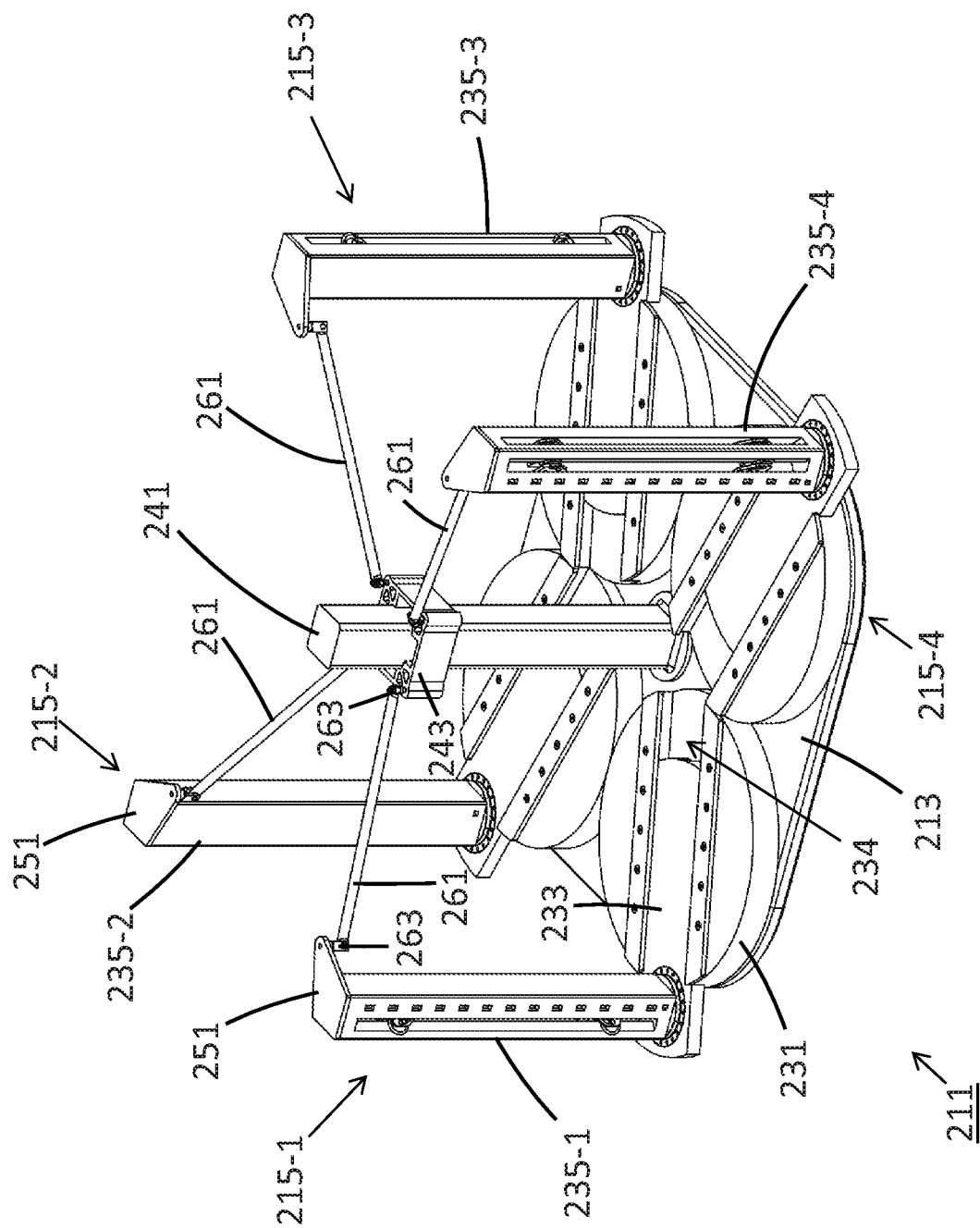

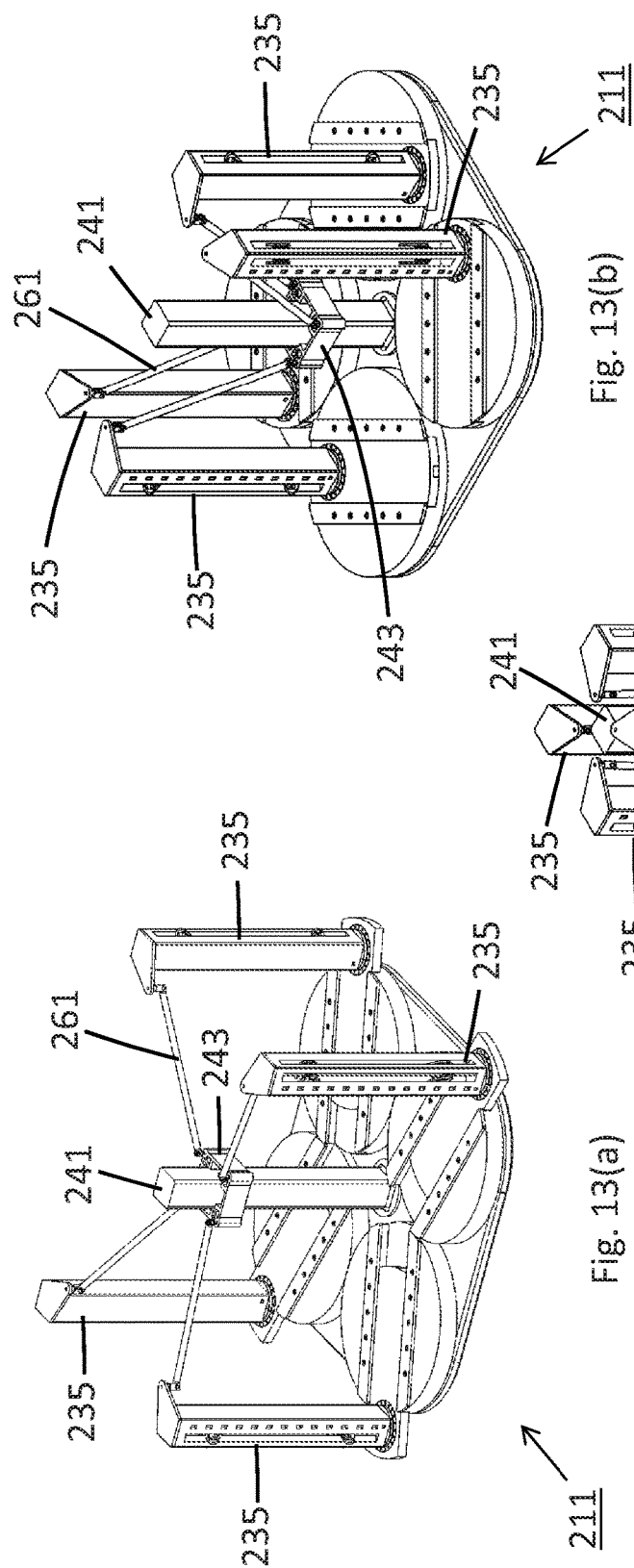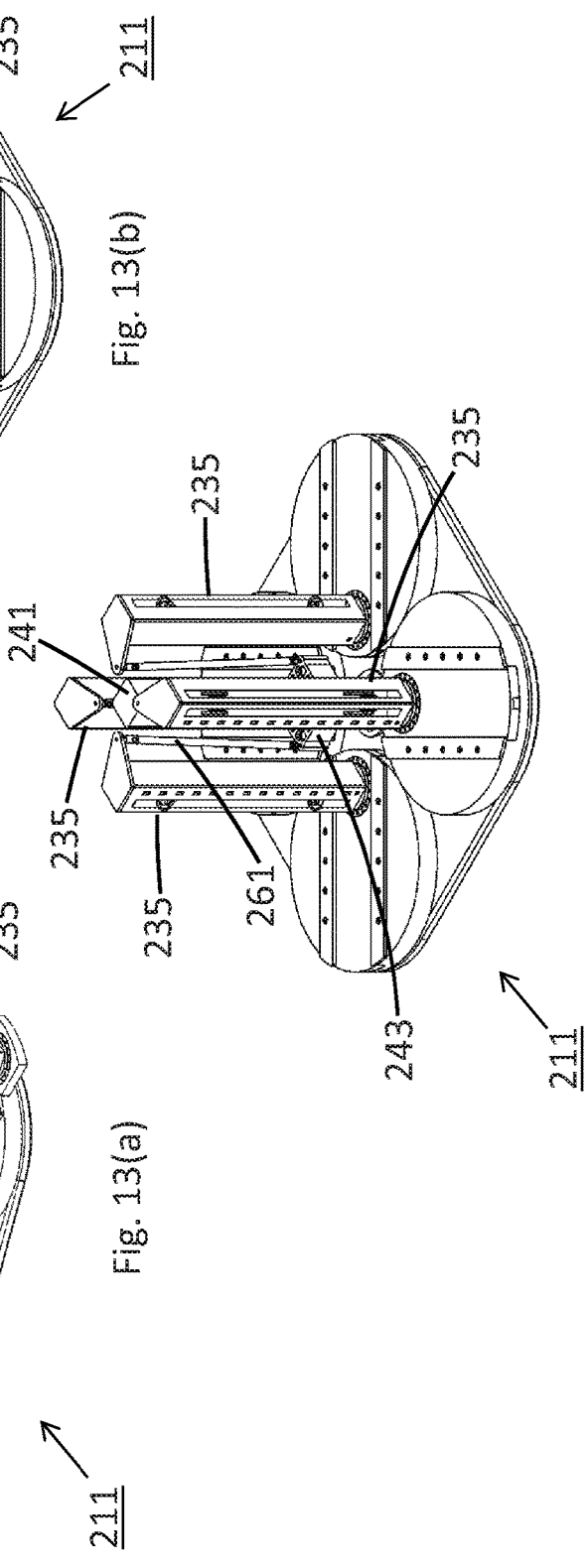

SIZE-ADJUSTABLE MANDREL AND METHOD OF CONSTRUCTING A BOX USING THE SAME

FIELD OF THE INVENTION

The present invention relates generally to the packaging and shipment of consumer products and, more particularly, to methods for constructing boxes used in the packaging and shipment of consumer products.

BACKGROUND OF THE INVENTION

The proliferation of e-commerce has created a commensurate increase in need for packaging solutions that are appropriate in the shipment of consumer products. Nonetheless, despite the growing demand for effective shipment packaging, online purchase fulfillment remains most commonly processed using single-use, fixed-size boxes.

E-commerce shipment boxes are most commonly constructed from a preformed, unitary blank that is constructed of a rigid, durable and inexpensive material, such as cardboard or plastic. The blank is shaped to define a plurality of panels that are typically separated by areas of weakness, such as fold lines. Accordingly, as part of the assembly process, the blank is folded about the fold lines to erect the box, with the shape secured through the use of interlocking panels and/or an adhesive.

Although well-known and widely used in the art, boxes formed from a preformed blank, as described above, suffer from a notable drawback. Notably, boxes formed from a preformed blank are fixed in size and thereby incapable of dimensional variability. However, due to the near limitless variety of different products currently available online, packaging requirements can vary considerably depending upon the size and shape of the items ultimately shipped to the purchaser.

As a result, online businesses and e-commerce fulfillment centers often maintain a comprehensive inventory of differently dimensioned boxes. Yet, it has been found that online purchase fulfillment remains largely incapable of packaging and shipping products within an appropriately-sized box. Rather, current studies have indicated online purchases are most commonly packaged in an inefficient fashion, with the average e-commerce package containing approximately 40% of empty, or void, space.

The aforementioned inefficiency in the packaging of products ordered online has been found to create a number of notable shortcomings.

As a first shortcoming, the use of a container that is considerably larger than the products packaged therein results in a corresponding increase in packaging costs. In particular, a greater amount of material is required to form the box itself, with the amount of excess packaging material often exceeding 15% of the amount of corresponding material required to construct an ideally-sized package. Additionally, a substantial about of package filler is typically needed to fill in the empty space within a conventional e-commerce box to prevent product movement and potential damage during shipment, with the amount of excess package filler often exceeding 60% of the amount of corresponding package filler needed in an ideally-sized package.

As a second shortcoming, the use of a container that is considerably larger than the products packaged therein results in a corresponding increase in transportation costs. Notably, storage and delivery costs are typically directly proportional to the size and/or weight of a shipped item. Therefore, an unnecessarily oversized package creates transportation inefficiencies (i.e. increased weight and smaller payloads) for couriers that are, in turn, often financially borne by the consumer. In fact, it has been found that the transportation cost associated with traditional, inefficiently-sized, e-commerce packages often exceeds 20% of the corresponding transportation cost for an ideally-sized package.

SUMMARY OF THE INVENTION

It is an object of the present invention to provide a new and improved method for constructing a box for use in the packaging and shipment of consumer products.

It is another object of the present invention to provide a method for constructing a box, as referenced above, using a mandrel around which the box is formed.

It is yet another object of the present invention to provide a method for constructing a box, as referenced above, wherein the size of the mandrel can be adjusted to modify the dimensions of the box to be formed.

It is still yet another object of the present invention to provide a method for constructing a box, as referenced above, using a mandrel which has a limited number of parts, is inexpensive to manufacture and is easy to use.

Accordingly, as a feature of the invention, there is provided a mandrel comprising (a) a platform having a top surface and a bottom surface, and (b) a plurality of peripheral members mounted on the platform, each of the plurality of peripheral members comprising a vertical upright which is displaceable relative to the platform.

As another feature of the invention, there is provided a method of constructing a box, the method comprising the steps of (a) providing a size-adjustable mandrel, and (b) winding a continuous strip of material in a helical configuration around the size-adjustable mandrel so as to form a main box body with a plurality of bands.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts:

FIG. 1 is a top perspective view of a first embodiment of a size-adjustable mandrel constructed according to the teachings of the present invention;

FIGS. 2(a) and 2(b) are top plan and top perspective views, respectively, of the platform shown in FIG. 1;

FIGS. 4(a) and 4(b) are front perspective and rear perspective views, respectively, of the peripheral member shown in FIG. 3, the peripheral member being shown with the tongue linearly displaced relative to the disc-shaped base to adjust the location of the vertical upright;

FIG. 5 is an enlarged, fragmentary, rear perspective view of the peripheral member shown in FIG. 4(b), the view being useful in illustrating the cutting mechanism of the peripheral member;

FIGS. 7(a)-(c) are top perspective views of the mandrel shown in FIG. 1, the mandrel being shown with the vertical uprights arranged in various configurations to illustrate the adjustability of the mandrel in forming boxes of varying dimensions;

FIGS. 9(a) and 9(b) are front plan and left side views, respectively, of the box body shown in FIG. 8, the box body being shown with a limited selection of its partially overlapping bands for ease of illustration;

FIG. 10 is an enlarged, fragmentary, left end view of the box body shown in FIG. 9(b), taken within circled region E to more closely illustrate the helical arrangement between adjacent bands of the box body;

FIG. 12 is a top perspective view of a second embodiment of a size-adjustable mandrel constructed according to the teachings of the present invention; and FIGS. 13(a)-(c) are top perspective views of the size-adjustable mandrel shown in FIG. 12, the mandrel being shown with the vertical uprights arranged in various configurations to illustrate the adjustability of the mandrel in forming boxes of varying dimensions.

DETAILED DESCRIPTION OF THE INVENTION

Size-Adjustable Mandrel 11

Figure 4A:
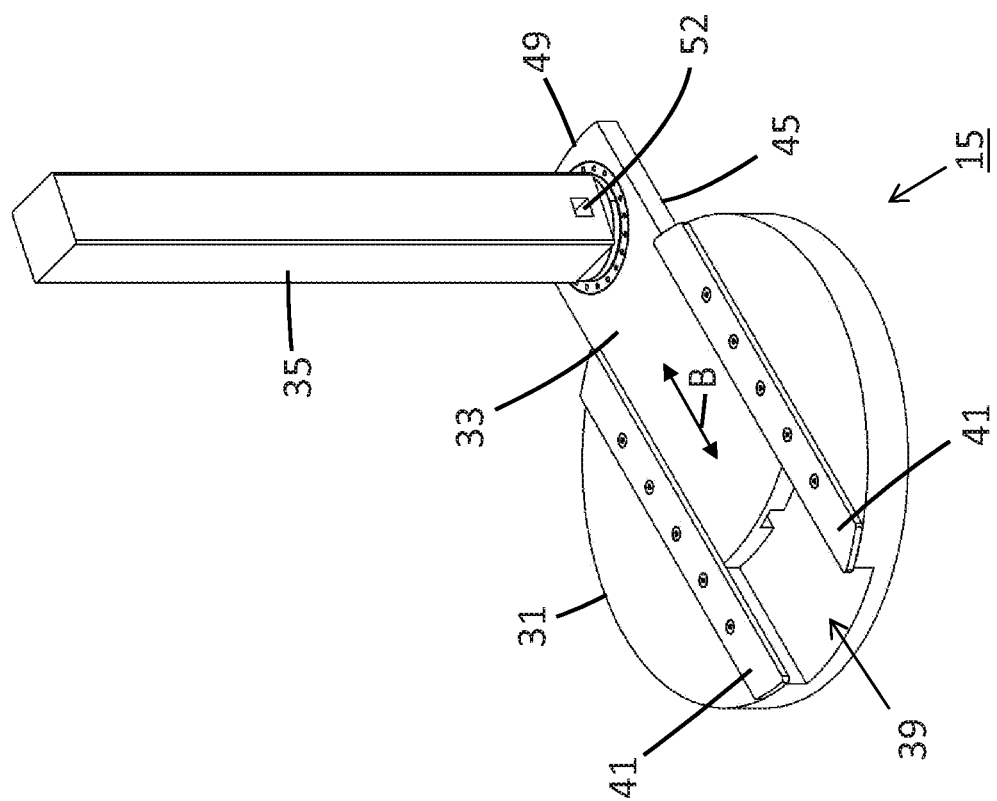

Referring now to FIG. 1, there is shown a first embodiment of a size-adjustable mandrel constructed according to the teachings of the present invention, the mandrel being defined generally by reference numeral 11. As will be explained in detail below, size-adjustable mandrel 11 is designed principally for use in constructing a box or other similar type of container. In use, mandrel 11 serves as a form around which a continuous strip of material is helically wrapped to construct the main box body. As a primary feature of the present invention, mandrel 11 can be adjusted in size to allow for dimensional variability of a box constructed therefrom. In this manner, mandrel 11 enables a box to be customized in shape for the particular consumer products to be retained therein, which is highly desirable.

As defined herein, the term "box" denotes any enclosable packaging that is appropriately configured to store and transport one or more consumer products without any restriction to shape, size or material. For instance, use of the term "box" herein is not restricted to a container in the shape of a polyhedron (i.e. formed with multiple planar faces), but rather encompasses all conceivable packaging configurations, such as tubular packaging boxes and envelope-type shipping containers.

Furthermore, although mandrel 11 is described below in connection with a novel method of constructing a box, it is to be understood that additional applications (i.e. other than box manufacture) could be achieved using mandrel 11 without departing from the spirit of the present invention.

As seen in FIG. 1, mandrel 11 comprises a common platform 13 on which a plurality of peripheral members 15-1 thru 15-4 is independently mounted, each peripheral member 15 being adapted for displacement relative to platform 13. As will be explained in detail below, peripheral members 15 serve as the boundary defining elements, or the general footprint, around which a box is constructed. Accordingly, a multitude of box configurations can be custom manufactured using mandrel 11 by simply moving peripheral members 15 relative to one another.

Referring now to FIGS. 2(a) and 2(b), platform 13 is a unitary, plate-like support which is preferably constructed of a rigid and durable material that is suitable for supporting the principal components of mandrel 11 during its routine operation. Platform 13 is represented herein as having a generally rectangular configuration, the dimensions of which are preferably selected to accommodate the maximum desired size of a box constructed therefrom.

Platform 13 includes a generally flat bottom surface 17 and a generally flat top surface 19. A centrally-located bore 21 extends transversely through platform 13. As will be explained further below, bore 21 axially receives a main drive mechanism (not shown) that is secured to platform 13. In this capacity, the main drive mechanism can be driven (e.g. manually or with the use of a motor coupled thereto) in order to rotate platform 13 about the axis defined by bore 21, as represented by arrow A in FIG. 2(b). This rotation of platform 13 is used to facilitate the helical winding of a strip of material around peripheral members 15 during the box construction process.

Four separate through-holes 23-1 thru 23-4 are additionally formed in platform 13 in a symmetric, equidistant relationship relative to central bore 21. Each through-hole 23 serves as a mounting hole which axially receives a drive mechanism for a corresponding peripheral member 15. As such, each peripheral member 15 is adapted to rotate on top surface 19 of platform 13 about the axis defined by its corresponding through-hole 23, as will be explained further below.

Figure 3:
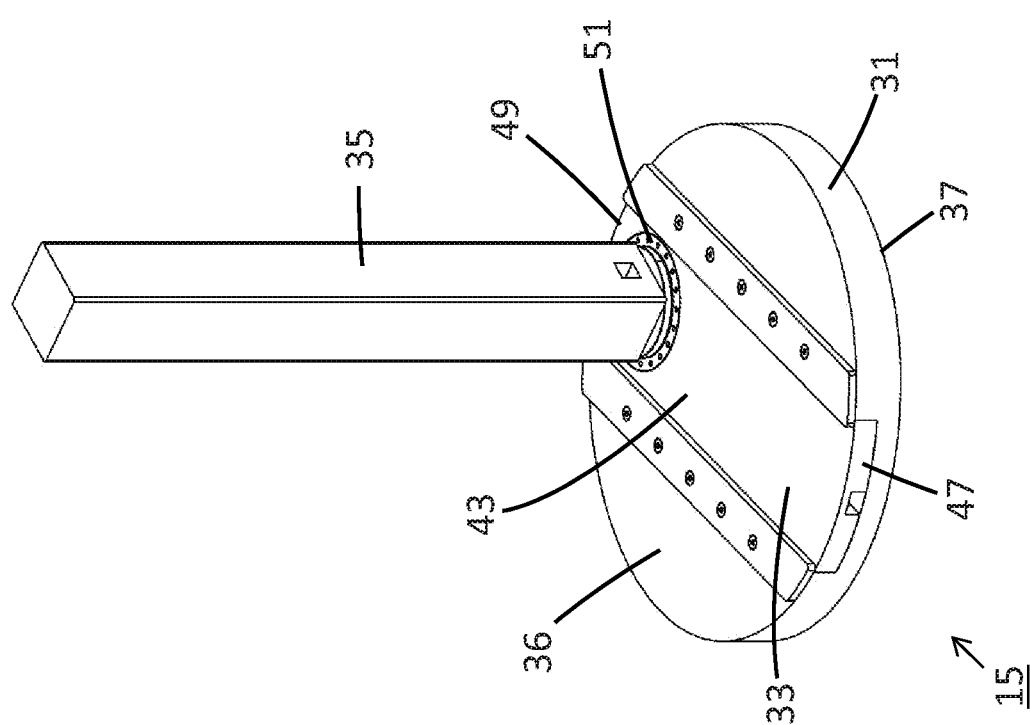
FIG. 3 is a front perspective of one of the peripheral members shown in FIG. 1.

As referenced above, each peripheral member 15 is rotatably mounted on top surface 19 of platform 13 and serves as a boundary defining element about which a box can be constructed through a novel helical winding process. Referring now to FIGS. 3, 4(a) and 4(b), each peripheral member 15 comprises a disc-shaped base 31, a tongue 33 slidably connected to base 31, and a vertical upright 35 rotatably mounted on tongue 33.

Base 31 is a disc-shaped element which includes a flattened top surface 36 and a flattened bottom surface 37. Although not shown herein, a peripheral drive mechanism is coupled to bottom surface 37 of base 31 and protrudes axially within a corresponding through-hole 23 in platform 13. In this manner, base 31 is rotatably retained on platform 13, with bottom surface 37 of base 31 disposed in contact against top surface 19 of platform 13.

To limit wear within the region of contact between base 31 and platform 13, one or more surfaces may be treated with a lubricant or other similar low-friction material. In addition to, or in lieu thereof, a bearing element may be disposed between contact surfaces to facilitate rotation and limit frictional forces.

As can be seen, an elongated channel, or trough, 39 is formed in top surface 36 of base 31 across its diameter. Channel 39 is generally rectangular in lateral cross-section and is dimensioned to fittingly receive tongue 33, as will be described further below. A pair of flanges 41 is mounted onto top surface 36 of base 31 on opposing sides of channel 39. Each flange 41 partially overlies channel 39 and thereby serves as a lip, or protrusion, that retains tongue 33 within channel 39.

Tongue, or plank, 33 is an elongated unitary member that is dimensioned for fitted insertion within channel 39. Tongue 33 comprises a flattened top surface 43, a flattened bottom surface 45, a proximal, or inner, end 47 and a distal, or outer, end 49. As shown in FIG. 3, tongue 33 is preferably of a length such that, with tongue 33 in its neutral position, both inner end 47 and outer end 49 lie generally flush with the outer edge of base 31.

As referenced briefly above, flanges 41 overlie a portion of tongue 33 to prevent inadvertent disassociation of tongue 33 from base 31. As a result, tongue 33 is limited to linear displacement within channel 39 along the path represented by arrow B in FIG. 4(a). Although not shown herein, a tongue drive mechanism is preferably coupled to tongue 33 (e.g. via a longitudinal channel formed in bottom surface 45) to both drive tongue 33 along linear path B as well as lock tongue 33 in place, for reasons to become apparent below.

To limit wear within the region of contact between tongue 33 and base 31, one or more surfaces may be treated with a lubricant or other similar low-friction material. In addition to, or in lieu thereof, a bearing element may be disposed within channel 39 to facilitate linear displacement of tongue 33 and limit frictional forces.

Upright, or tower, 35 extends vertically upward from top surface 43 of tongue 33 at distal end 49. As can be seen in FIGS. 3, 4(a) and 4(b), upright 35 is preferably in the form of an elongated, hollowed post, which is generally square-shaped in transverse cross-section. As part of the novel box construction process to be described further in detail below, a strip of material is wrapped around each upright 35. In this capacity, the plurality of uprights 35 together define the basic footprint of a box constructed using mandrel 11.

Preferably, each tower 35 is rotatably coupled to tongue 33 via a slewing ring 51. As such, slewing ring 51 enables upright 35 to be maintained at the requisite angle of orientation relative to the other peripheral members 15 as mandrel 11 adjusts between various box configurations.

A rod-receiving channel 52, generally rectangular in cross-section, extends transversely through each upright 35 proximate slewing ring 51. As will be explained in further detail below, channel 52 is dimensioned to receive a rod which is used to, inter alia, maintain pairs of uprights 35 in the necessary angular alignment.

As seen most clearly in FIGS. 4(b) and 5, upper and lower cutting mechanisms 53-1 and 53-2 are incorporated into each upright 35. As will be explained further below, cutting mechanisms 53 are provided to create upper and lower sets of vertical slots in a box body formed using mandrel 11. By creating vertical slots, top and bottom sets of flaps are defined in the box body which can be use to selectively enclose the resultant box.

Each cutting mechanism 53 includes a bearing block 55 that is disposed within upright 35 and is adapted to be linearly driven along a vertical path of defined length (e.g. by a rack-and-pinion type drive mechanism). Additionally, a pair of cutting wheels 57-1 and 57-2 is rotatably connected to bearing block 55, each wheel 57 having a sharpened peripheral edge 58 that is suitable for cutting a paper-based box material.

As can be seen, cutting wheels 57-1 and 57-2 project partially through longitudinal slots 59-1 and 59-2, respectively, which are formed in the outer, distal corner of each upright 35. Due to the length and configuration of slots 59, each cutting wheel 57 is designed to retract within upright 35 at one terminal end of its travel path. This ensures that cutting wheels 57 do not sever a box constructed using mandrel 11 at any time during its manufacture other than the slot forming process.

Referring back to FIG. 1, size-adjustable mandrel 11 is additionally provided with a pair of alignment, or guide, rods 61-1 and 61-2. Each rod 61 is preferably in the form of an elongated, linear bar having a uniform, rectangular cross-section along the majority of its length.

Rod 61-1 extends through channel 52 in uprights 35-1 and 35-2, whereas rod 61-2 extends through channel 52 in uprights 35-3 and 35-4. Although each rod 61 is dimensioned for fitted insertion through channels 52, it is to be understood that each upright 35 is able to slide freely along the length of its associated rod 61 (e.g. by treating the region of contact with a suitable lubricant).

As can be appreciated, rods 61 provide stability to uprights 35 during the box forming process. Additionally, rods 61 help maintain pairs of uprights 35 in a generally parallel relationship (i.e. to ensure a square-shaped or rectangular footprint). More specifically, rods 61 maintain the planar box panel surface defined by uprights 35-1 and 35-2 in generally parallel relationship relative to the planar box panel surface defined by uprights 35-3 and 35-4.

As referenced briefly above, the relative position of each upright 35 can be adjusted relative to platform 13 as well as the other remaining uprights 35 via (i) linear and/or (ii) rotational movement. As a consequence, the overall footprint of uprights 35 can be modified, as needed, to allow for the construction of a box that is optimally configured to receive a consumer product (i.e. with minimal empty space).

As seen most clearly in FIG. 4(a), linear displacement of each upright 35 is achieved through the linear displacement of tongue 33 within channel 39 in base 31 (i.e. along the path represented by arrow B). As referenced previously, a drive mechanism can be utilized to not only displace tongue 33 within channel 39 but also subsequently lock tongue 33 in place once optimally positioned.

Figure 6A:
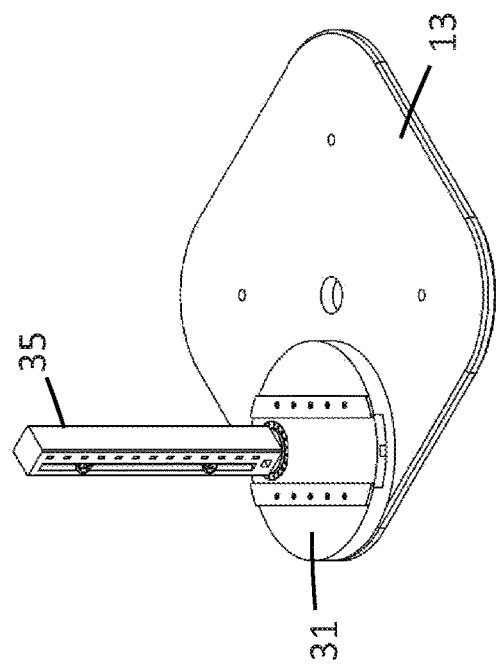
FIGS. 6(a)-(d) are top perspective views of one of the peripheral members shown in FIG. 1, the peripheral member being shown mounted on the platform at various stages of being rotated.
Figure 6B:
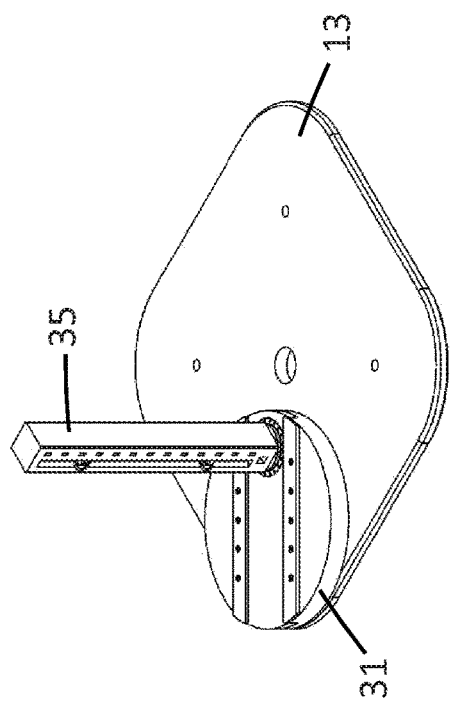
Figure 6C:
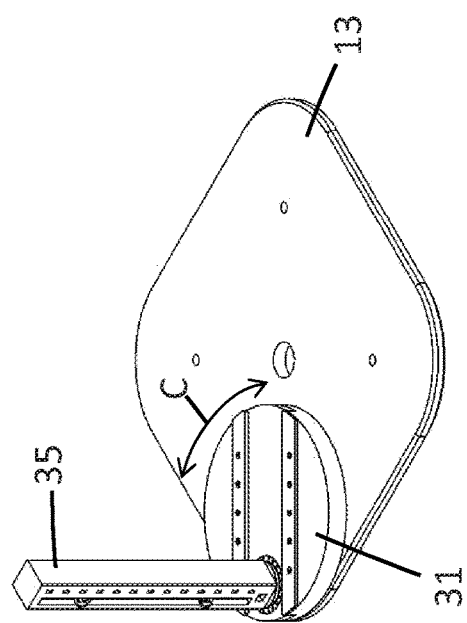
Figure 6D:
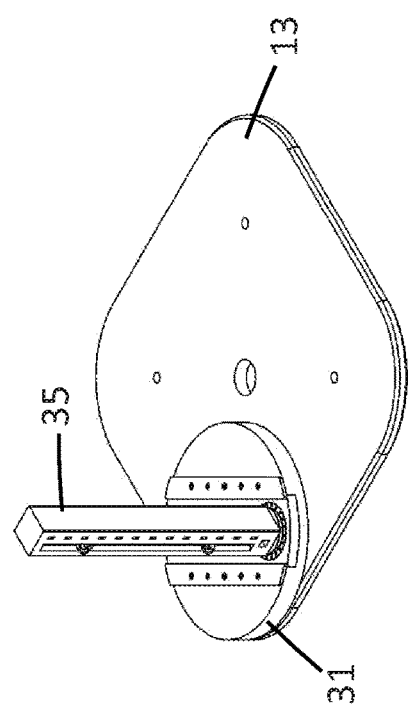

Rotational displacement of each upright 35 is achieved by rotatably driving base 31, in either direction, relative to platform 13, as represented by arrow C in FIG. 6(a). Through the acute angular displacement of base 31, the relative position of upright 35 relative to platform 13 can be adjusted, as shown in FIGS. 6(b)-(d). As referenced previously, a drive mechanism can be utilized to not only rotate base 31 relative to platform 13 but also subsequently lock base 31 in place once optimally positioned.

Accordingly, through the linear and/or rotational displacement of uprights 35 relative to platform 13, a wide variety of mandrel footprints (and resultant box configurations) can be achieved, as illustrated in FIGS. 7(a)-(c). For instance, in FIG. 7(a), mandrel 11 is represented in a first configuration with each upright 35 positioned in a respective corner of platform 13. With uprights 35 oriented as such, mandrel 11 is suitably configured to construct a large, square-shaped box.

From the first configuration shown in FIG. 7(a), coupled pairs of peripheral members 15 can be inwardly rotated to reduce the width of a box formed therefrom. Specifically, in FIG. 7(b), base 31 of peripheral members 15-1 and 15-2 is rotated inward, as represented by arrows D, to reduce the spacing between uprights 35-1 and 35-2. In a similar fashion, base 31 of peripheral members 15-3 and 15-4 is rotated inward, as represented by arrows D', to reduce the spacing between uprights 35-3 and 35-4. In both instances, uprights 35 slide freely along alignment rods 61, with rods 61 helping to retain uprights 35 in a generally rectangular footprint. Arranged in the manner shown in FIG. 7(b), mandrel 11 is suitably configured to construct a medium-sized, rectangular box.

From the second configuration shown in FIG. 7(b), coupled pairs of peripheral members 15 can be further inwardly rotated to ultimately yield the mandrel configuration represented in FIG. 7(c). As shown, uprights 35 are drawn very close to one another, with alignment rods 61 maintaining coupled pairs of uprights 35 in a parallel relationship. Arranged in the manner shown in FIG. 7(c), mandrel 11 is suitably configured to construct a small-sized, square-shaped box.

Box Construction Method Using Mandrel 11

Using mandrel 11, a novel box construction method can be implemented to yield a box 111 which is customized in configuration to receive one or more consumer products with limited wasted space. The preferred sequence of steps in such a box construction method is set forth in detail below.

Specifically, as the first step in the box construction process, mandrel 11 is adjusted in size to the desired box configuration. As referenced above, the relative position of vertical uprights 35 on platform 13 is adjusted through linear and/or rotational movement of the individual peripheral members 15. Thereafter, vertical uprights 35 are locked in place in the desired footprint (i.e. length and width) of a box to be formed therefrom.

Figure 8:
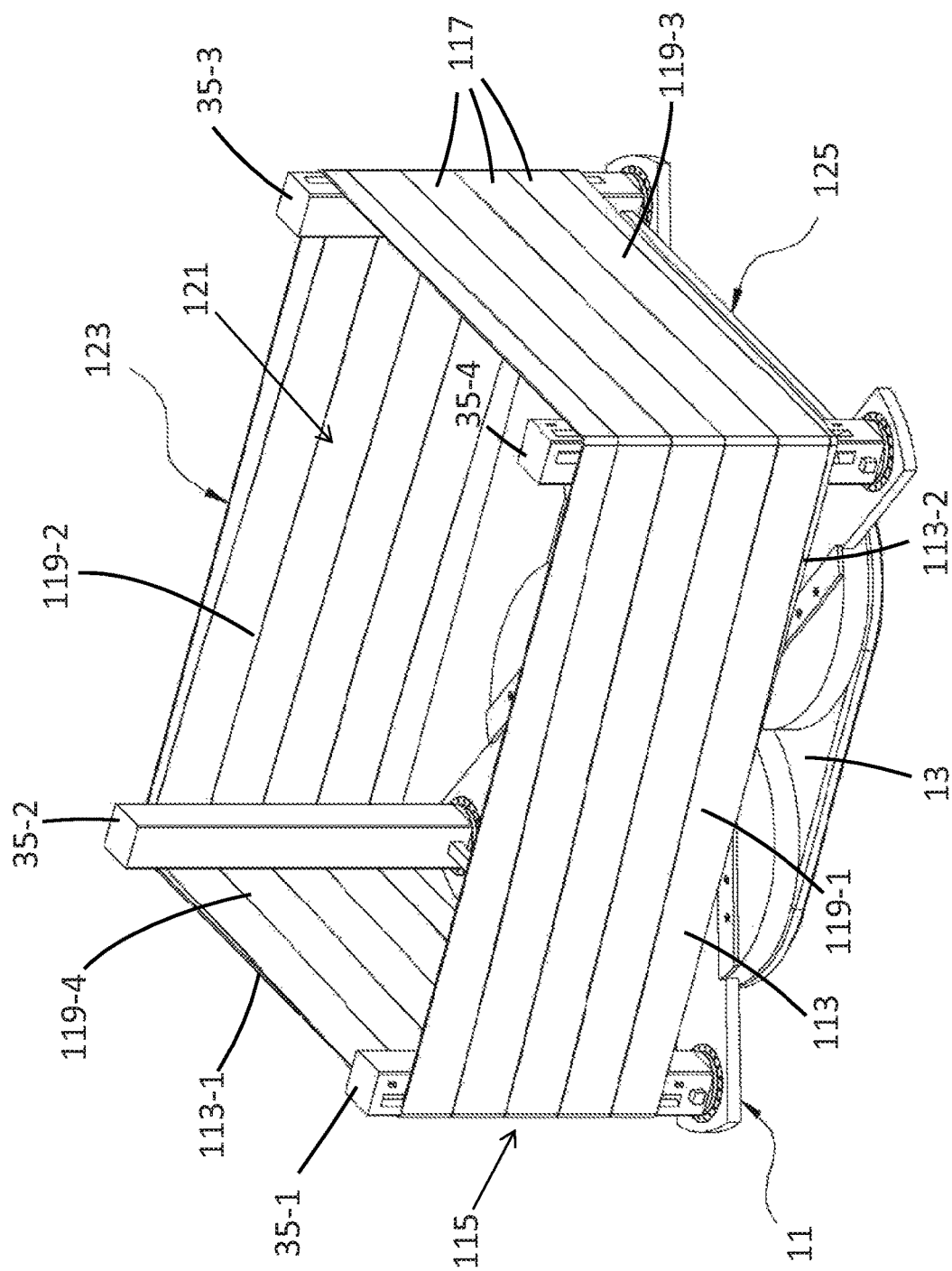
FIG. 8 is a top perspective view of the size-adjustable mandrel shown in FIG. 1, the mandrel being shown used as a form around which a continuous strip of material is helically wrapped as part of a novel box construction method.

Referring now to FIG. 8, with mandrel 11 optimally configured, a continuous strip of material 113 is helically wound around mandrel 11 to form a box body 115 with partially overlapping bands 117. As defined herein, the term "helical" denotes that strip 113 is wrapped about a center axis, in either a clockwise or counterclockwise direction, to form three-dimensional box body 115. The resultant box body 115 achieved from the helical wrapping of strip 113 can therefore include regions that are flattened and/or curved in any representation.

In the present embodiment, box body 115 is represented as a four-sided member comprising a front panel 119-1, a rear panel 119-2, a first side panel 119-3 and a second side panel 119-4 that together define an interior cavity 121 that can be accessed through an open top end 123 and/or an open bottom end 125. Furthermore, box body 115 is shown comprising six separate bands 117. However, as will be explained in detail below, the number of bands, or turns, 117 is selected based upon the desired height of box 111 (i.e. to fittingly receive the intended product to be packaged) and, as such, is intended to be modified to suit the particular needs of the intended application.

Preferably, strip 113 is constructed out of any heavy-duty material that is suitable for use in the packaging of consumer products (e.g. a corrugated cardboard material). To facilitate dispensing and minimize storage requirements, material strip 113 is preferably supplied in the form of a relatively compact reel or fanfold arrangement.

As seen most clearly in FIGS. 9(a) and 9(b), material strip 113 comprises a flattened front surface 131, a flattened rear surface 133, a narrow top edge 135 and a narrow bottom edge 137. Preferably, strip 113 is of uniform thickness along the majority of its length. However, as will be explained further below, the leading and trail ends of strip 113 are preferably cut, or otherwise tapered, to render the distal edge of open top end 123 and the distal edge of open bottom end 125 generally planar.

As represented herein, each successive, or adjacent, band 117 partially overlies its predecessor. For instance, as shown in FIG. 10, band 117-4 partially overlies band 117-3, with rear surface 133 of band 117-4 along its bottom edge 137 in contact with front surface 131 of band 117-3 along its top edge 135. In this manner, further helical winding of strap 113 can be performed, as needed, to construct box 111 at the desired height.

However, it should be noted that strap 113 need not be helically wound in a partially overlapping fashion. Rather, it is to be understood that strap 113 could be alternatively helically wound (e.g. with adjacent bands 117 in direct vertical alignment) without departing from the spirit of the present invention.

The helical winding of material strip 113 around mandrel 11 can be achieved using various techniques. However, because platform 13 is adapted for rotational displacement about the axis defined by central bore 21, the strip winding process can be most easily achieved by (i) rotating the entire mandrel 11 (via platform 13) and (ii) gradually displacing the supply, or reel, of strip material 113 vertically upward along a linear path.

During the helical winding process, a quick-dry adhesive 141 is preferably applied to front surface 131 of strip 113 along top edge 135 immediately after being dispensed from its supply reel. Accordingly, adhesive 141 aligns within the region of contact between adjacent bands 117 of box body 115, as seen most clearly in FIG. 10. In this manner, the adhesive bond established between adjacent bands 117 fixedly secures box body 115 in the desired shape.

Once box body 115 is of a height suitable for the consumer products to be packaged therein (while compensating for the width of top and bottom flaps to be subsequently formed therefrom), strip 113 is cut from the remainder of its supply reel. Thereafter, leading end 113-1 and trail end 113-2 are preferably trimmed (i.e. tapered in width) to form a narrow wedge-like tip, as seen most clearly in FIG. 8. In this manner, each of open top end 123 and open bottom end 125 of box body 115 is rendered generally planar, the benefit of which will become apparent below.

With box body 115 formed in the manner set forth above, vertical slots are the formed in box body 115 to create flaps for selectively enclosing open top end 123 and open bottom end 125. Specifically, as part of the slot forming process, upper and lower cutting mechanisms 53-1 and 53-2 in each peripheral member 15 are linearly driven such that cutting wheels 57 sever box body 115 within its designated corner. It is important to note that slewing rings 51 ensure that each upright 35 is properly oriented within its corresponding corner of box body 115 to create slots in the proper location.

Figure 11B:
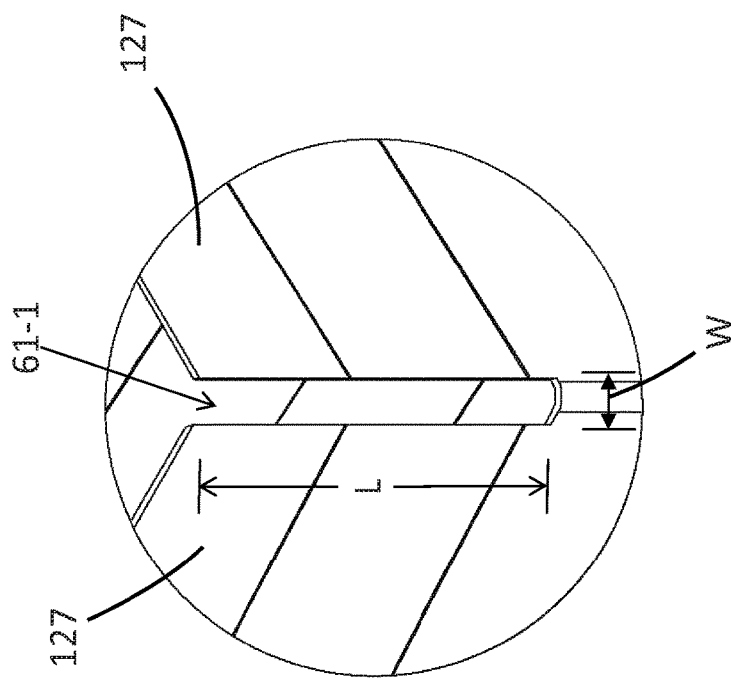
FIG. 11(b) is an enlarged, fragmentary, perspective view of the box shown in FIG. 11(a), taken within circled region F to more closely illustrate one of the vertical slots in the box body.
Figure 11A:
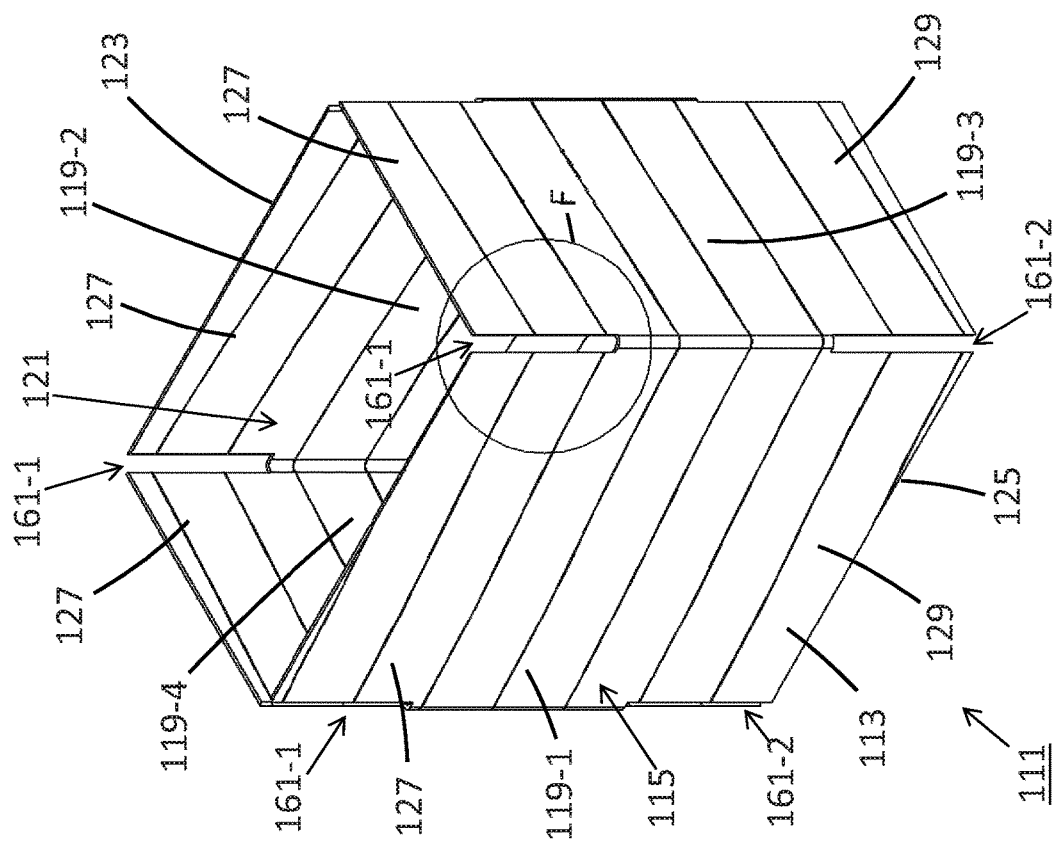
FIG. 11(a) is a top perspective view of a resultant box formed by slotting the box body shown in FIG. 8, the box being shown with its top and bottom flaps positioned open.

As seen in FIGS. 11(a) and 11(b), the aforementioned cutting process creates a first set of vertical slots 161-1 in open top end 123 of box body 115 at the juncture, or corner, of adjacent panels 119. Similarly, a second set of vertical slots 161-2 is formed in open bottom end 125 of box body 115 at the juncture, or corner, of adjacent panels 119.

In this manner, box 111 is constructed to include a set of pivotable top flaps 127 which are dimensioned to selectively enclose open top end 123 and set of pivotable bottom flaps 129 which are dimensioned to selectively enclose bottom end 125. As seen most clearly in FIG. 11(b), each slot 161 is of a fixed length, or depth, L that is suitable for creating appropriately dimensioned flaps 127 and 129. Also, each slot 161 is preferably of a width W that prevents interference between adjacent top and bottom flaps 127 and 129, while, at the same time, ensures adequate enclosure of open top and bottom ends 123 and 125 when pivoted closed.

It should be noted that the box construction method of the present invention need not be limited to a slotting process to enclose open top end 123 and/or open bottom end 125 of box body 115. Rather, alternative means for enclosing open top end 123 and/or open bottom end 125 of box body 115 could be implemented without departing from the spirit of the present invention. For instance, a series of creases could be incorporated into box body 115 to create areas of weakness through which box body 115 can be folded to create flaps capable of enclosing open top end 123 and/or open bottom end 125.

After the aforementioned slotting process, a horizontal notch (not shown) is preferably formed in the exterior of box body 115 as a line separating, or defining, the proximal edge of each of flaps 127 and 129 from its adjacent panel 119 (i.e. linearly between the terminal ends of adjacent upper and lower slots 161). As such, each linear notch, or score line, creates a region of weakness which facilitates folding of flaps 127 and 129.

Upon completion of the aforementioned slotting and scoring processes, the outer dimensions, or footprint, of mandrel 11 is temporarily contracted to the extent necessary that box 111 can be easily removed therefrom. In other words, uprights 35 are drawn inward towards one another and away from the corners of box body 113.

Thereafter, to package the desired products within box 111, bottom flaps 129 are first pivoted closed and are, in turn, secured together using a suitable adhesive, such as tape. The desired product is then deposited within interior cavity 121 through open top end 123. Due to the customized sizing of box 111, interior cavity 121 is dimensioned to fittingly receive the product with minimal excess space. Afterwards, top flaps 127 are pivoted closed and secured together with a suitable adhesive material, thereby completing the customized packaging of the designated product.

Alternate Embodiments and Design Modifications

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

For instance, it should be noted that mandrel 11 is not limited to the use of alignment rods 61 to stabilize and maintain the configuration of vertical uprights 35. Rather, it is to be understood that alternative means for supporting and aligning vertical uprights 35 could be implemented without departing from the spirit of the present invention.

Specifically, referring now to FIG. 12, there is shown a second embodiment of a mandrel constructed according to the teachings of the present invention, the mandrel being identified generally by reference numeral 211. As can be seen, mandrel 211 is similar to mandrel 11 in that mandrel 211 comprises a common platform 213 on which a plurality of peripheral members 215-1 thru 215-4 is independently mounted. Additionally, each peripheral member 215 comprises a disc-shaped base 231 rotatably mounted on common platform 213, a tongue 233 slidably mounted within a channel 234 formed in base 231, and a vertical upright, or tower, 235 rotatably mounted at an end of tongue 233.

However, mandrel 211 differs from mandrel 11 in that mandrel 211 does not connect opposing pairs of uprights 235 with guide, or alignment, rods 61. Rather, each vertical upright 235 in mandrel 211 is coupled to, and supported by, a center upright, or tower, 241. In use, center upright 241 provides stability to each of the footprint-defining uprights 235 and thereby enables uprights 235 to withstand significant lateral loads when a strip of material is wound around mandrel 211 during the box construction process.

Center upright 241 is fixedly mounted onto platform 213 at its approximate midpoint and extends vertically upward in a generally orthogonal relationship relative thereto. As can be seen, upright 241 is generally of the same length and cross-section as each upright 235.

A collar, or sleeve, 243 is axially mounted on center upright 241 in a fitted relationship relative thereto. Collar 243 is adapted to slide along the length of upright 241, with the region of contact between collar 243 and upright 241 being applied with some form of lubricant and/or bushing to minimize frictional forces. A locking mechanism (not shown) is connected to collar 243 and is designed to selectively lock in place the position of collar 243 along upright 241.

A plate-like end cap 251 is fixedly mounted onto the free end of each peripheral upright 235. In turn, a stabilization rod 261 connects the end cap 251 on each peripheral upright 235 to collar 243. Preferably, a bushing 263 is provided at each end of rod 261 to enable the pitch and yaw of rods 261 to change, as needed, during reconfiguration of peripheral uprights 235.

In this manner, it is to be understood that the position of uprights 235 relative to support 213 can be adjusted to modify the box-defining footprint of mandrel 211. As uprights 235 move, collar 243 slides axially along center upright 241, as needed, to accommodate the lengths of rods 261. Once uprights 235 are ideally configured for the intended application, collar 243 is locked in position so that center upright 241 can adequately support peripheral uprights 235 through rods 261.

For instance, in FIG. 13(a), peripheral uprights 235 are spaced far apart and are suitably configured to construct a large, rectangular box. With peripheral uprights 235 positioned as such, collar 243 is locked in position on center upright 241 near its distal, or upper, end. In FIG. 13(b), peripheral uprights 235 are repositioned in a configuration suitable for the construction of a medium-sized, rectangular box. With peripheral uprights 235 positioned as such, collar 243 is locked in position on center upright 241 at an intermediary location of its length. Lastly, in FIG. 13(c), peripheral uprights 235 are repositioned in a configuration suitable for the construction of a small-sized, square-shaped box. With peripheral uprights 235 positioned as such, collar 243 is locked in position on center upright near its proximal, or lower, end.

What is claimed is:

1. A mandrel, comprising:
   (a) a platform having a top surface and a bottom surface; and
   (b) a plurality of peripheral members mounted on the platform, each of the plurality of peripheral members comprising a vertical upright which is displaceable relative to the platform, wherein each of the plurality of peripheral members comprises a base rotatably mounted on the top surface of the platform.

2. The mandrel as claimed in claim 1 wherein the vertical upright is rotatably displaceable relative to the platform.

3. The mandrel as claimed in claim 1 wherein the vertical upright is linearly displaceable relative to the platform.

4. The mandrel as claimed in claim 1 wherein each of the plurality of peripheral members comprises a tongue slidably coupled to the base, the tongue being restricted to displacement along a linear path.

5. The mandrel as claimed in claim 4 wherein the vertical upright is rotatably mounted on the tongue.

6. The mandrel as claimed in claim 1 further comprising a rod for coupling together the vertical uprights for two of the plurality of peripheral members.

7. The mandrel as claimed in claim 1 further comprising a center upright to which the vertical upright for each of the plurality of peripheral members is coupled.

8. The mandrel as claimed in claim 7 wherein a collar is axially mounted on the center upright and is adapted for longitudinal displacement relative thereto.

9. The mandrel as claimed in claim 8, wherein a rod couples the vertical upright for each of the plurality of peripheral members to the collar.

10. A mandrel, comprising:
  (a) a platform;
  (b) a plurality of peripheral members mounted on the platform, each of the plurality of peripheral members including a vertical upright which is displaceable relative to the platform;
  (c) a center upright and a collar that is axially mounted on the center upright and configured to move up and down the center upright; and
  (d) a plurality of rods, each of the plurality of rods being arranged to couple a respective one of the plurality of vertical members to the collar.

* * * * *